(12) United States Patent
Venneri

(10) Patent No.: US 10,573,416 B2
(45) Date of Patent: Feb. 25, 2020

(54) NUCLEAR FUEL PARTICLE HAVING A PRESSURE VESSEL COMPRISING LAYERS OF PYROLYTIC GRAPHITE AND SILICON CARBIDE

(71) Applicant: Ultra Safe Nuclear Corporation, Los Alamos, NM (US)

(72) Inventor: Francesco Venneri, Los Alamos, NM (US)

(73) Assignee: Ultra Safe Nuclear Corporation, Los Alamos, NM (US)

( * ) Notice: Subject to any disclaimer, the term of this patent is extended or adjusted under 35 U.S.C. 154(b) by 283 days.

(21) Appl. No.: 15/472,676

(22) Filed: Mar. 29, 2017

(65) Prior Publication Data

US 2017/0301415 A1 Oct. 19, 2017

Related U.S. Application Data

(60) Provisional application No. 62/314,702, filed on Mar. 29, 2016.

(51) Int. Cl.
*G21C 3/20* (2006.01)
*G21C 3/62* (2006.01)
(Continued)

(52) U.S. Cl.
CPC ............... *G21C 3/20* (2013.01); *G21C 3/04* (2013.01); *G21C 3/626* (2013.01); *G21C 21/02* (2013.01); *G21C 3/62* (2013.01); *Y02E 30/40* (2013.01)

(58) Field of Classification Search
CPC .............. G21C 3/20; G21C 3/04; G21C 3/62
(Continued)

(56) References Cited

U.S. PATENT DOCUMENTS 2,950,238 A 8/1960 Nicholson
3,826,754 A 7/1974 Grossman
(Continued)

FOREIGN PATENT DOCUMENTS

JP 2006-504086 A 2/2006
JP 2006-234405 A 9/2006
(Continued)

OTHER PUBLICATIONS

IAEA Safeguards Glossary, 2001 Edition, International Nuclear Verification Series No. 3. (Year: 2002).*
(Continued)

*Primary Examiner* — Jack W Keith
*Assistant Examiner* — Daniel Wasil
(74) *Attorney, Agent, or Firm* — Drinker Biddle & Reath LLP

(57) ABSTRACT

Micro encapsulated fuel particles enhance safety in high-temperature gas cooled reactors by employing multiple barriers to fission product release. Microencapsulated fuel particles also have the potential to do the same in other reactor platforms. The present disclosure provides a method for enhancing the ability of microencapsulated fuel particles to retain radionuclides and thereby further enhance safety in nuclear reactors. Specifically, a nuclear fuel particle including a fuel kernel; a buffer graphitic carbon layer; an inner pyrolytic carbon layer; a multilayer pressure vessel; and an outer pyrolytic carbon layer is disclosed. The multilayer pressure vessel includes alternating layers of silicon carbide and pyrolytic carbon.

7 Claims, 2 Drawing Sheets

(51) Int. Cl.
*G21C 3/04* (2006.01)
*G21C 21/02* (2006.01)

(58) Field of Classification Search
USPC .................................. 376/411, 414; 252/636
See application file for complete search history.

(56) References Cited

U.S. PATENT DOCUMENTS

| | | | |
|---|---|---|---|
| 3,907,948 A | 9/1975 | Gyarmati et al. | |
| 4,297,169 A | 10/1981 | Grubb | |
| 4,597,936 A | 7/1986 | Kaae | |
| 4,683,114 A | 7/1987 | Ho et al. | |
| 4,707,330 A | 11/1987 | Ferrari | |
| 4,869,867 A | 9/1989 | Lay et al. | |
| 4,869,886 A | 9/1989 | Saiki et al. | |
| 4,963,758 A | 10/1990 | Noren et al. | |
| 4,978,480 A | 12/1990 | Stansfield et al. | |
| 5,268,947 A | 12/1993 | Bastide et al. | |
| 5,805,657 A | 9/1998 | Heubeck | |
| 6,162,543 A | 12/2000 | Dubots et al. | |
| 8,475,747 B1 | 7/2013 | Johnson et al. | |
| 9,224,506 B2 | 12/2015 | Broli et al. | |
| 9,299,464 B2 | 3/2016 | Venneri et al. | |
| 10,109,378 B2 | 10/2018 | Snead | |
| 2003/0113447 A1 | 6/2003 | Sherwood et al. | |
| 2005/0195933 A1 | 9/2005 | Dorr et al. | |
| 2006/0039524 A1 | 2/2006 | Feinroth et al. | |
| 2008/0159464 A1 | 7/2008 | Futterer et al. | |
| 2009/0032178 A1 | 2/2009 | Feinroth | |
| 2010/0290578 A1 | 11/2010 | Farrell et al. | |
| 2010/0296621 A1 | 11/2010 | Broli et al. | |
| 2011/0080987 A1 | 4/2011 | Watanabe et al. | |
| 2011/0091004 A1 | 4/2011 | Farmer et al. | |
| 2011/0317794 A1 | 12/2011 | Venneri et al. | |
| 2012/0140867 A1* | 6/2012 | Venneri ............... | G21C 3/20 376/414 |
| 2014/0220230 A1* | 8/2014 | Kuczynski ............ | G21C 3/07 427/6 |
| 2015/0170767 A1 | 6/2015 | Venneri | |
| 2015/0221398 A1 | 8/2015 | Subhash et al. | |
| 2015/0310948 A1 | 10/2015 | Venneri et al. | |
| 2017/0025192 A1 | 1/2017 | Snead | |
| 2017/0287575 A1 | 10/2017 | Venneri | |
| 2017/0287577 A1 | 10/2017 | Venneri | |
| 2017/0301423 A1* | 10/2017 | Pierce ................. | G21C 3/20 |

FOREIGN PATENT DOCUMENTS

| | | |
|---|---|---|
| JP | 2007-010472 A | 1/2007 |
| JP | 2007-086024 A | 4/2007 |
| JP | 2010-512529 A | 4/2010 |
| KR | 10-2013-0102766 A | 9/2013 |
| WO | WO-2008/071676 A1 | 6/2008 |
| WO | WO-2009/058185 A2 | 5/2009 |
| WO | WO-2010/086431 A1 | 8/2010 |
| WO | WO-2012/129677 A1 | 10/2012 |
| WO | WO-2014/028731 A1 | 2/2014 |

OTHER PUBLICATIONS

International Search Report and Written Opinion dated Dec. 8, 2016 issued in corresponding International Patent Application No. PCT/US2016/043897 (10 pages).

International Search Report and Written Opinion dated Aug. 8, 2017 issued in corresponding international patent application No. PCT/US2017/019887 (13 pages).

International Search Report and Written Opinion dated Mar. 13, 2017 in corresponding International patent application No. PCT/US2016/063975 (13 pages).

International Preliminary Report on Patentability dated Jun. 4, 2013, in International Patent Application No. PCT/US2011/062560, filed Nov. 30, 2011.

K. D. Weaver et al., Gen IV Nuclear Energy Systems: Gas-Cooled Fast Reactor (GFR), FY-04 Annual Report, Sep. 2004, Idaho National Engineering and Environmental Laboratory, INEEL/EXT-04-02361.

M. K. Meyer et al., Fuel Development for Gas-Cooled Fast Reactors, Journal of Nuclear Materials, 371 (2007), pp. 281-287.

Sterbentz, J.W. et al., "Reactor Physics Parametric and Depletion Studies in Support of TRISO Particle Fuel Specification for the Next Generation Nuclear Plant," INEEL/EXT-04-02331, Sep. 2004, Idaho National Engineering and Environmental Laboratory, Idaho Falls, Idaho.

TRISO-Coated Particle Fuel Phenomenon Indentification and Ranking Tables (PIRTs) for Fission Product Transport Due to Manufacturing, Operations, and Accidents, NUREG-6844, vol. 1, Jul. 2004, U.S. Nuclear Regulatory Commission, Washington, DC.

TRISCO-Coated Particle Fuel Phenomenon Identification and Ranking Tables (PIRTs) for Fission Product Transport Due to Manufacturing, Operations, and Accidents, Appendices A through D, NUREG-6844, vol. 2, Jul. 2004, U.S. Nuclear Regulatory Commission, Washington, DC.

TRISCO-Coated Particle Fuel Phenomenon Identification and Ranking Tables (PIRTs) for Fission Product Transport Due to Manufacturing, Operations, and accidents, Appendices E through I, NUREG-6844, vol. 3, Jul. 2004, U.S. Nuclear Regulatory Commission, Washington, DC.

U.S. Office Action dated Jan. 8, 2014 that issued in U.S. Appl. No. 12/959,115 including Double Patenting Rejections on pp. 3-5.

International Search Report and Written Opinion dated Jul. 11, 2017 issued in corresponding International patent application No. PCT/US2017/024794 (15 pages).

Extended European search report dated Sep. 19, 2019 issued in European patent application No. 16897455.8.

* cited by examiner

NUCLEAR FUEL PARTICLE HAVING A PRESSURE VESSEL COMPRISING LAYERS OF PYROLYTIC GRAPHITE AND SILICON CARBIDE

CROSS-REFERENCE TO RELATED APPLICATION

This application claims benefit to U.S. provisional application No. 62/314,702 filed on Mar. 29, 2016, the entire contents of which is incorporated by reference herein.

TECHNICAL FIELD

The present disclosure relates to fission nuclear fuels. More specifically, the present disclosure describes a method to produce microencapsulated fuel forms with enhanced toughness in their ceramic coating layer and microencapsulated fuel forms made therein.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

There are many known types of nuclear fuel for both research and power producing nuclear reactors. The fuel can be of many types, including both fissionable (fissile) isotopes and fissile-producing (fertile) isotopes of Uranium, Plutonium, or Thorium, forming as example ceramic carbides, oxides, nitrides, or silicides. With the near complete dominance of current generation of light-water reactors (LWR's) for nuclear power production uranium dioxide ($UO_2$) pellets have become the de facto standard nuclear fuel. The $UO_2$ pellet is used in a pressured water reactor (PWR) and the boiling water reactor (BWR) configurations, being mass-produced through a ceramic processing route: once a powder of appropriate purity and fissile isotope enrichment is achieved it is pressed and then sintered in the presence of hydrogen and taken to final dimension by center-less grinding. Once the finished product is qualified it is placed inside a zirconium alloy tube and weld-sealed in an inert helium environment. This zirconium tube, during normal reactor operation, serves a number of functions including the plenum (barrier) for containment of the radiotoxic fission product gases.

Another type of reactor is a high-temperature Gas-Cooled Reactor (HTGR). The HTGR reactors, whether in the prismatic or pebble-bed configuration, utilize a fuel specifically engineered as a primary barrier to fission product retention. This is achieved through engineering layers of carbon, graphite and silicon carbide (SiC) around a fissile-material-bearing (U, Pu, etc.) fuel kernel. In this design, the SiC coating layer specifically becomes a pressure vessel. Such a structure is known as a tristructure isotropic (TRISO) fuel. An example of a traditional TRISO fuel is illustrated by a schematic showing the layers in FIG. 1. Specifically, the traditional TRISO 10 of FIG. 1 includes a fissile fuel kernel 11, a buffer graphitic layer 12, an inner pyrolytic carbon layer 13, silicon carbide layer 14, and an outer pyrolytic carbon layer 15. The traditional TRISO 10 can be pressed into a host graphite matrix (not shown) and used in a small number of commercial power reactors.

More recently, a fuel form has been developed whereby TRISO fuel, rather than being compacted within a graphite matrix, as is the case for HTGR, is compacted within a strong and impermeable fully dense SiC matrix. That fuel has been developed and previously described as a more robust fuel whereby the SiC layer of the microencapsulated "TRISO" fuel and the dense ceramic SiC matrix into which they are contained provide two barriers to fission product release in addition to any external cladding that may be present. A secondary barrier to fission product release significantly enhances the safety aspects of a nuclear fuel and reduces the related safety systems of modern LWR's, as well as benefiting gas-cooled reactors.

SUMMARY

The present disclosure provides a fabrication method for forming a TRISO particle with an enhanced toughness in the SiC coating layer of the TRISO particle. The coated fuel particle fabrication utilizes the fluidized bed coating furnace and precursor gases that are current in use for forming traditional TRISO particles. However, the deposition schedule is altered such that a single SiC coating layer is replaced with a multilayer pressure vessel including alternating layers of SiC and pyrolytic carbon (PyC or pyrocarbon).

The multilayer pressure vessel including alternating layers of SiC and PyC enhances the toughness of the ceramic pressure vessel. Specifically, it was found that thin PyC layers between layers of SiC serve to deflect any cracks that develop in the structure. Although the multilayer structure could exhibit reduced strength compared with the single SiC layer, failure in these coated fuel structures is governed by probability of microcrack propagation. According, the multilayer has the effect of greatly enhancing the ability of the fuel to retain radionuclides compared to the single SiC layer. Additionally, the multilayer structure will exhibit higher tolerance for elastic strains and should delay the onset of any microcrack formation in the first place.

One fuel particle including the multilayer structure includes: a fissile fuel kernel, a buffer graphitic carbon layer, an inner pyrolytic carbon layer, a multilayer pressure vessel, and an outer pyrolytic carbon layer.

A method of forming a fuel particle described above includes: providing a fissile fuel kernel; coating a buffer graphitic layer on the fuel kernel; coating an inner layer of pyrolytic carbon onto the buffer graphitic layer; coating a multilayer pressure vessel onto the inner layer of pyrolytic carbon; coating an outer layer of pyrolytic carbon onto the multilayer pressure vessel.

In a particular embodiment, the method comprises providing a fissile fuel kernel in a CVD furnace; depositing a buffer graphitic layer on the fuel kernel by decomposition of acetylene; depositing an inner layer of pyrolytic carbon onto the buffer graphitic layer by decomposition of a mixture of acetylene and propylene; depositing a multilayer pressure vessel onto the inner layer of pyrolytic carbon by alternatingly decomposing MTS and a mixture of acetylene/propylene during a continuous coating layer deposition process; and depositing an outer layer of pyrolytic carbon onto the multilayer pressure vessel by decomposition of a mixture of acetylene and propylene. All of the various coating layers can be deposited in a serial coating run without any interruption. The continuous deposition of different coatings can be achieved by adjusting the furnace temperature and switching between reactant gases once a coating step is complete. The deposition of thin SiC and PyC layers can also be reasonably achieved by employing a similar strategy.

In an embodiment of the above fuel particle or the above method, the multilayer pressure vessel includes at least three layers in which a pyrolytic graphite layer is present between two layers of silicon carbide.

In an embodiment according to any of the above fuel particles or the above methods, the multilayer pressure vessel includes at least one additional pair of pyrolytic graphite layer and silicon carbide layer between the pyrolytic graphite layer and one of the two layers of silicon carbide. In an embodiment, according to any of the above fuel particles or the above methods, the multilayer pressure vessel includes at least 2, at least 3, at least 4, or at least 5 pairs of pyrolytic graphite layer and silicon carbide layer. In each of the above mentioned embodiments, the pyrolytic graphite layer(s) and the silicon carbide layer(s) alternate throughout the multilayer pressure vessel. Accordingly, the pyrolytic graphite layers separate layers of silicon carbide.

In an embodiment according to any of the above fuel particles or the above methods, the multilayer pressure vessel has a thickness from 20 to 50 µm, 25 to 45 µm, 30 to 40 µm, or about 35 µm.

In an embodiment according to any of the above fuel particles or the above methods, the buffer carbon layer has a thickness from 50 to 300 µm, 70 to 200 µm, 80 to 150 µm, or about 100 µm.

In an embodiment according to any of the above fuel particles or the above methods, the inner and outer layers of pyrolytic graphite each has a thickness from 10 to 100 µm, 20 to 50 µm, 30 to 40 µm, or about 40 µm.

In an embodiment according to any of the above fuel particles or the above methods, each of the silicon carbide layers of the multilayer pressure vessel has a thickness from 200 nm to 10 µm, 200 nm to 5 µm, 300 nm to 2000 nm, or 400 nm to 1000 nm.

In an embodiment according to any of the above fuel particles or the above methods, each of the pyrolytic graphite layers of the multilayer pressure vessel has a thickness from 20 nm to 1000 nm, 20 nm to 500 nm, 30 nm to 200 nm, or 40 nm to 100 nm.

In an embodiment according to any of the above fuel particles or the above methods, a thickness of the silicon carbide layers of the multilayer pressure vessel is at least 2, 3, 4, 5, 6, 7, 10, 20, 50, 100, 200, or 500 times a thickness of the pyrolytic graphite layers of the multilayer pressure vessel.

In an embodiment according to any of the above fuel particles or the above methods, the fuel kernel includes fissile and/or fertile materials (e.g., uranium, plutonium, thorium, etc.) in an oxide, carbide, or oxycarbide form. In a particular embodiment, the fuel kernel includes low enriched uranium (LEU) of any suitable enrichment level.

In an embodiment according to any of the above fuel particles or the above methods, the fuel kernel includes transuranic elements extracted from a spent fuel of a light water reactor.

In an embodiment according to any of the above fuel particles, the fuel kernel includes transuranic elements extracted from a nuclear weapon.

In an embodiment according to any of the methods, each of the coating steps occurs in a fluidized chemical vapor deposition (CVD) furnace.

In an embodiment according to any of the methods, each of the coating steps includes flowing reactant gases and optional carrier gases inside the furnace. The optional carrier gases can be selected from Ar, H, or mixtures thereof. The thickness, density, and microstructure of each of the coating layers can be controlled by controlling the particle batch size, gas flow rate and mixture, furnace temperature, and deposition time.

In an embodiment according to the above method, the reactant gases include: acetylene ($C_2H_2$), the decomposition of which can form a porous buffer carbon layer; a mixture of acetylene and propylene ($C_3H_6$), the decomposition of which can form an inner pyrolytic carbon layer; and methyltrichlorosilane ($CH_3SiCl_3$) or MTS, the decomposition of which can form an isotropic layer of silicon carbide.

BRIEF DESCRIPTION OF THE DRAWINGS

Embodiments of the invention will now be described by way of example with reference to the accompanying drawings, of which.

DETAILED DESCRIPTION OF PARTICULAR EMBODIMENTS

The following detailed description can be read in connection with the accompanying drawings in which like numerals designate like elements.

Figure 1:
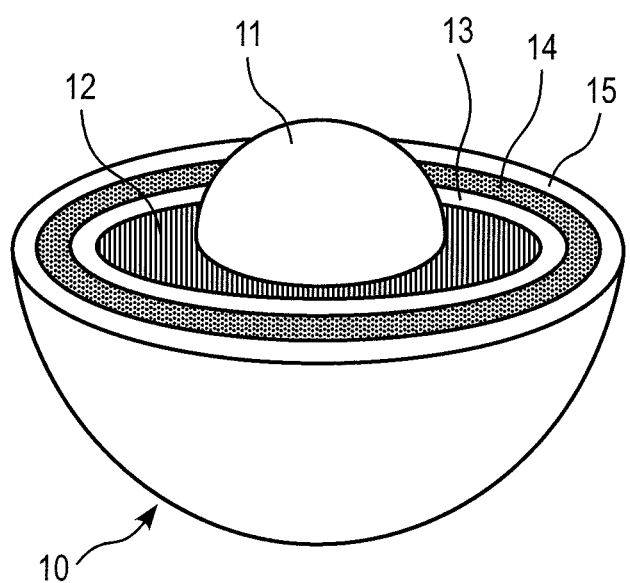
FIG. 1 is a schematic diagram illustrating a traditional TRISO fuel particle.
Figure 2:
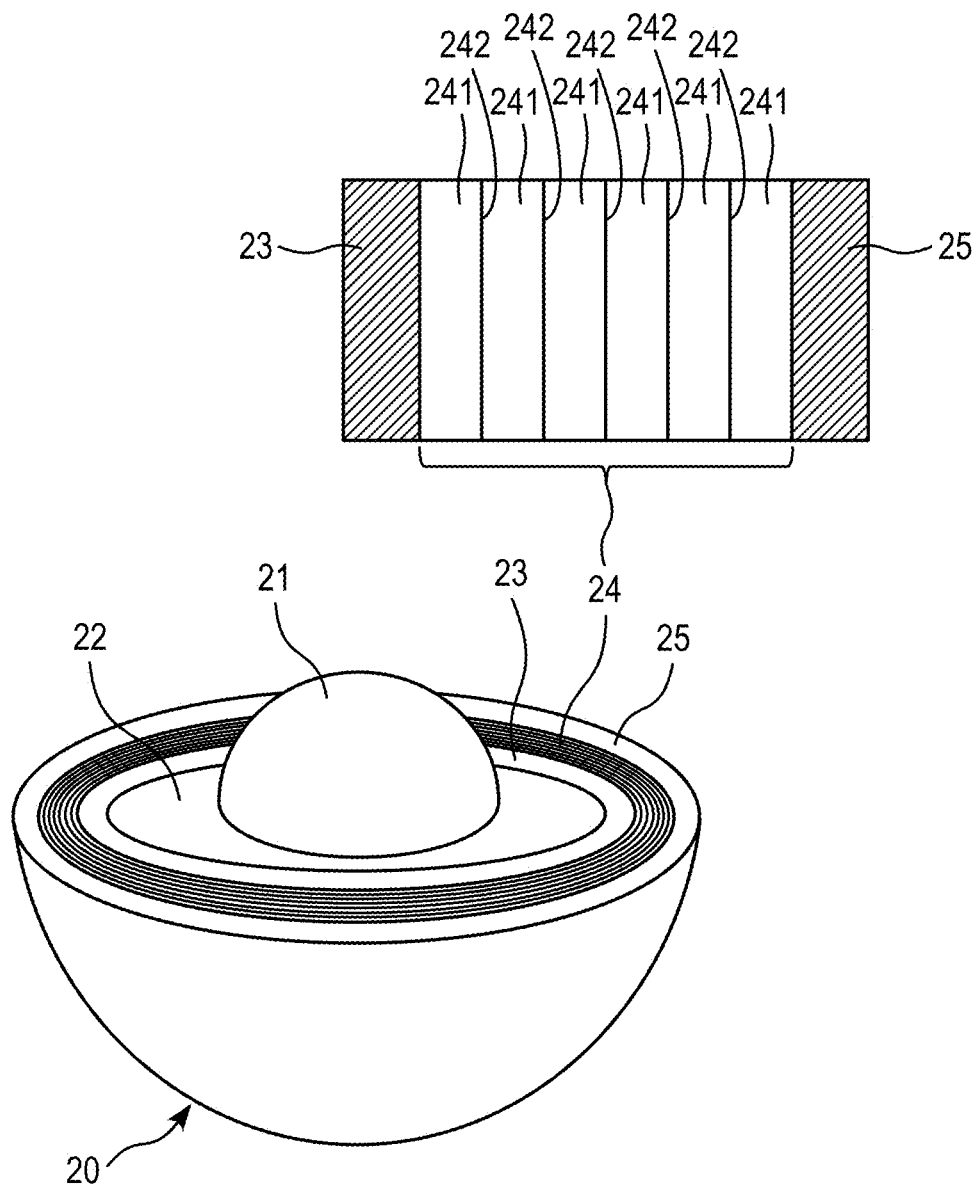
FIG. 2 is a schematic diagram illustrating a fuel particle according to an embodiment of the invention.

FIG. 2 is a schematic diagram illustrating a fuel particle according to an embodiment of the invention. In FIG. 2, fuel particle 20 includes a fissile fuel kernel 21, a buffer graphitic layer 22, an inner pyrolytic carbon layer 23, a multilayer pressure vessel 24, and an outer pyrolytic carbon layer 25. The multilayer pressure vessel 24 includes silicon carbides layers 241 and pyrolytic graphitic layers 242 as alternating coatings and appear as stripes in the cross-section of FIG. 2.

The fuel particle 20 can be pressed into a host graphite matrix or an impermeable silicon carbide matrix (not shown) and used in a power reactor.

In the embodiment shown in FIG. 2, the fuel particle 20 includes a fuel kernel 21 at its center. The fuel kernel may comprise fissile and/or fertile materials (e.g., uranium, plutonium, thorium, etc.) in an oxide, carbide, or oxycarbide form. In a particular embodiment, the fuel kernel 21 includes low enriched uranium (LEU) of any suitable enrichment level.

When the fuel element is used for waste mitigation and/or disposal purposes, the fuel kernel 21 may alternatively or additionally include transuranics (TRU) and/or fission products extracted or otherwise reprocessed from spent fuels.

For example, the fuel element may be used for destruction of transuranic waste generated from, for example, light water reactors or decommissioned nuclear weapons. For that purpose, the fuel element may include fuel kernels 21 formed of transuranic elements extracted from a spent fuel of a light water reactor and/or a core of a nuclear weapon. According to a particular embodiment, a fuel element formed in accordance with the described methods may be used as fuel for a light water reactor to destroy the transuranic waste while, at the same time, generating power from it.

The carbon buffer layer 22 surrounds the fuel kernel 21 and serves as a reservoir for accommodating buildup of fission gases diffusing out of the fuel kernel 21 and any mechanical deformation that the fuel kernel 21 may undergo during the fuel cycle.

The inner PyC layer 23 may be formed of relatively dense PyC and seals the carbon buffer layer 22.

The multilayer pressure vessel 24 serves as a primary fission product barrier and a pressure vessel for the fuel kernel 21, retaining gaseous and metallic fission products therein. The multilayer pressure vessel 24 also provides overall structural integrity of the fuel particle 20.

In some embodiments, the SiC in the multilayer pressure vessel 24 may be replaced or supplemented with zirconium carbide (ZrC) or any other suitable material having similar properties as those of SiC and/or ZrC.

The outer PyC layer 25 protects the multilayer pressure vessel 24 from chemical attack during operation and acts as an additional diffusion boundary to the fission products. The outer PyC layer 25 may also serve as a substrate for bonding to a surrounding ceramic matrix.

The configuration and/or composition of the fuel particle 20 are not limited to the embodiments described above. Instead, it should be understood that a fuel particle consistent with the present disclosure may include one or more additional layers, or omit one or more layers other than the multilayer pressure vessel, depending on the desired properties of the fuel particle.

Although described in connection with preferred embodiments thereof, it will be appreciated by those skilled in the art that additions, deletions, modifications, and substitutions not specifically described may be made without departure from the scope of the invention as defined in the appended claims.

What is claimed is:

1. A nuclear fuel particle, comprising:
    a fuel kernel;
    a buffer graphitic carbon layer;
    an inner pyrolytic carbon layer;
    a multilayer pressure vessel including at least three layers in which a pyrolytic graphite layer is present between two layers of silicon carbide, wherein a thickness of the silicon carbide layers of the multilayer pressure vessel is at least 2 times a thickness of the pyrolytic graphite layers of the multilayer pressure vessel; and
    an outer pyrolytic carbon layer.

2. The nuclear fuel particle according to claim 1, wherein the multilayer pressure vessel includes at least two additional pairs of pyrolytic graphite layer and silicon carbide layer between the pyrolytic graphite layer and one of the two layers of silicon carbide.

3. The nuclear fuel particle according to claim 1, wherein the multilayer pressure vessel includes at least one additional pair of pyrolytic graphite layer and silicon carbide layer between the pyrolytic graphite layer and one of the two layers of silicon carbide.

4. The nuclear fuel particle according to claim 3, wherein the pyrolytic graphite layer(s) and the silicon carbide layer(s) alternate throughout the multilayer pressure vessel, thereby the pyrolytic graphite layers separate layers of silicon carbide.

5. The nuclear fuel particle according to claim 1, wherein each of the pyrolytic graphite layers of the multilayer pressure vessel has a thickness from 20 nm to 1000 nm.

6. The nuclear fuel particle according to claim 1, wherein the fuel kernel includes fissile and/or fertile materials in an oxide, carbide, or oxycarbide form.

7. The nuclear fuel particle according to claim 1, wherein the fuel kernel includes low enriched uranium (LEU).

* * * * *